United States Patent [19]

Kashiwaya et al.

[11] 4,442,818
[45] Apr. 17, 1984

[54] FUEL INJECTION APPARATUS FOR INTERNAL COMBUSTION ENGINES

[75] Inventors: Mineo Kashiwaya, Katsuta; Tohru Nakagawa, Mito; Kinsaku Yamada, Katsuta; Hiroshi Kamifuji, Katsuta; Yoshishige Oyama, Katsuta; Hiroshi Kuroiwa; Hisato Tsuruta, both of Hitachi, all of Japan

[73] Assignee: Hitachi, Ltd., Tokyo, Japan

[21] Appl. No.: 333,296

[22] Filed: Dec. 22, 1981

[30] Foreign Application Priority Data

Dec. 29, 1980 [JP] Japan ................. 55-188494
Dec. 29, 1980 [JP] Japan ................. 55-188495
Dec. 29, 1980 [JP] Japan ................. 55-188496
Dec. 29, 1980 [JP] Japan ................. 55-188497
Dec. 29, 1980 [JP] Japan ................. 55-188498
Dec. 29, 1980 [JP] Japan ................. 55-188499
Dec. 29, 1980 [JP] Japan ................. 55-188500
Dec. 29, 1980 [JP] Japan ................. 55-188501
Dec. 29, 1980 [JP] Japan ................. 55-188502

[51] Int. Cl.³ .................... F02M 7/22; F02B 33/00
[52] U.S. Cl. ................... 123/494; 123/493; 123/438; 123/489

[58] Field of Search ............ 123/493, 494, 482, 489, 123/438, 589

[56] References Cited

U.S. PATENT DOCUMENTS

| | | | |
|---|---|---|---|
| 3,776,208 | 12/1973 | Stumpp | 123/494 |
| 4,145,999 | 3/1979 | Aoki | 123/489 |
| 4,210,114 | 7/1980 | Watanabe | 123/489 |
| 4,294,212 | 10/1981 | Aoki | 123/438 |
| 4,364,354 | 12/1982 | Kosuge et al. | 123/438 |

Primary Examiner—Raymond A. Nelli
Attorney, Agent, or Firm—Antonelli, Terry & Wands

[57] ABSTRACT

A heat-type flow sensor is provided on the upstream side of a Venturi portion formed in an air-intake path and in an air bypass communicating with the Venturi portion. An electromagnetic device is provided to control the amount of air flowing in the air bypass so that the output of the heat-type flow sensor converges to a set level. This electromagnetic device drives a fuel-scaling valve to scale fuel in accordance with the change of the amount of air supplied to the engine, and this scaled fuel is continuously injected into the air-intake path.

46 Claims, 18 Drawing Figures

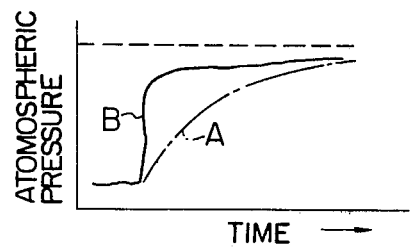
FIG. 6
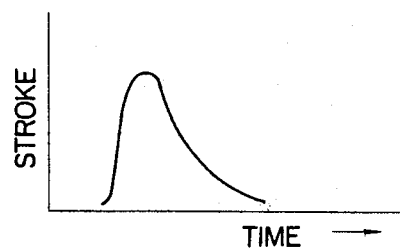
FIG. 7
FIG. 8
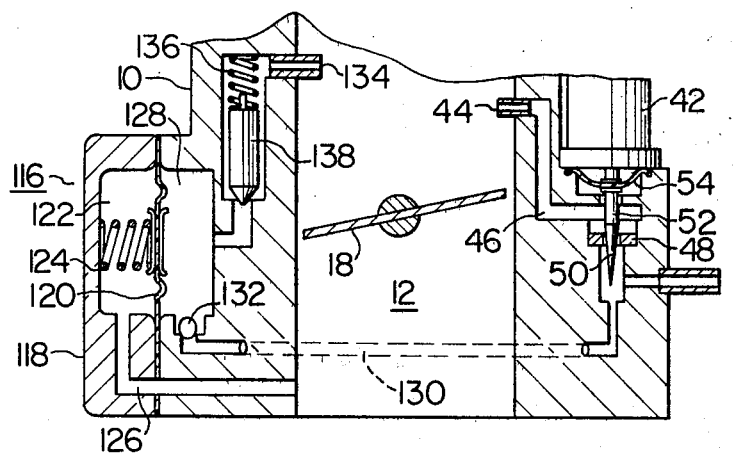
FIG. 9
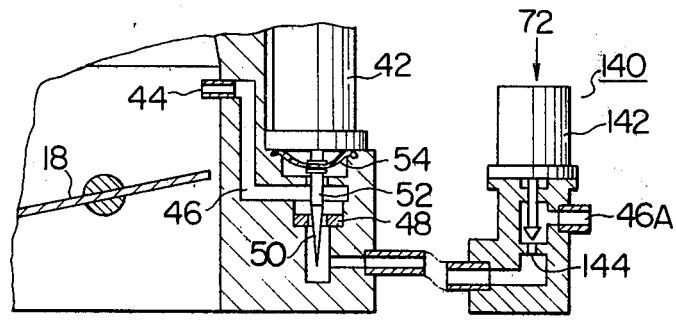

FUEL INJECTION APPARATUS FOR INTERNAL COMBUSTION ENGINES

This invention relates to fuel injection apparatus for internal combustion engines, and, more particularly, to a fuel injection apparatus for internal combustion engines which is capable of feeding fuel from a single fuel injection portion to all cylinders of an internal combustion engine.

In general, there is known a fuel injection apparatus for internal combustion engine which feeds fuel from a single fuel injection portion to all cylinders of an internal combustion engine.

This known fuel injection apparatus for internal combustion engine is constructed as follows. A throttle valve is provided in an air-intake path connected to the upstream side of an air-intake tube meeting portion communicating with each cylinder, and a fuel injection portion in provided on the upstream side of this throttle valve. Also, an electromagnetic valve forming the fuel injection portion is driven by a pulse with a certain width to intermittently inject fuel into the air-intake path. This valve opening pulse is controlled in its width by an air-intake amount signal which is detected by an air flow meter provided in the air-intake path.

This known fuel injection apparatus has the following drawbacks:

(1) Since the fuel injection portion intermittently injects fuel into the air-intake path connected to the upstream side of the air-intake tube meeting portion, thick and thin air-fuel mixture portions are alternately formed between the air-intake path and the air-intake tube meeting portion, that is, the air-fuel mixture becomes nonuniform in space. Thus, when the cylinders of the internal combustion engine sequentially intake the air-fuel mixture, some cylinders intake a thick mixture and another one does a thin mixture, that is, the distribution property of fuel is poor. This causes variation of torque in the internal combustion engine.

(2) Since the air flow meter is used to measure the amount of air intake and determine the valve opening pulse width over a wide range from idling drive to high-speed, high load drive, the precision of the air flow meter is required over the wide range. In other words, the air flow meter must practical detect the true amount of air taken in the internal combustion engine over the wide range from idling drive to high-speed, high load drive. This requires a high-precision air flow meter over a wide range and causes a signal processing circuit connected to the output of the air flow meter to be complicated in construction.

Accordingly, it is an object of this invention to provide a fuel injection apparatus for internal combustion engine in which fuel is supplied from a single fuel injection portion to all cylinders of the internal combustion engine, the fuel injected from the fuel injection portion is sufficiently mixed with the air taken in to produce a uniform mixture, the air flow meter for determining the amount of injected fuel is not required to have a high precision, and a signal processing circuit connected to the output of the air flow meter can be simplified in construction.

According to this invention, there is provided a fuel injection apparatus comprising an air-intake path connected to the upstream side of an air-intake tube meeting portion, a Venturi portion formed in the air-intake path, a throttle valve in the air-intake path on the downstream side of the Venturi portion, an air bypass connecting the upstream side of the Venturi portion and the Venturi portion, an air flow meter provided in the air bypass to detect the amount of air passing through the air bypass, an air-scaling valve provided in the bypass on the downstream side of the air flow meter, a fuel path for continuously supplying fuel from a fuel pump to the air-intake path during operation of internal combustion engine, a fuel-scaling valve provided in the fuel path, a drive means for controlling the degrees to which the air-scaling valve and fuel-scaling valve are opened so that when the air-scaling valve is displaced to decrease the amount of air flow in the air bypass, the fuel scaling valve is displaced to increase fuel, and a control signal generating means for supplying a control signal to the drive means so as to control the degree to which the air-scaling valve opens so that the output of the air flow meter converges to a predetermined set level.

The invention will become more readily understood from the following exemplary description taken with the accompanying drawings, wherein:

FIG. 6 is a graph of time-pressure characteristics of a pressure chamber constituting the acceleration correcting device of FIG. 5;

FIG. 7 is a graph of a time-stroke characteristic of a push rod constituting the acceleration correcting device of FIG. 5;

FIG. 8 is a cross-sectional diagram of a second acceleration correcting device in FIG. 2;

FIG. 9 is a cross-sectional diagram of a deceleration correcting device;

Figure 1:
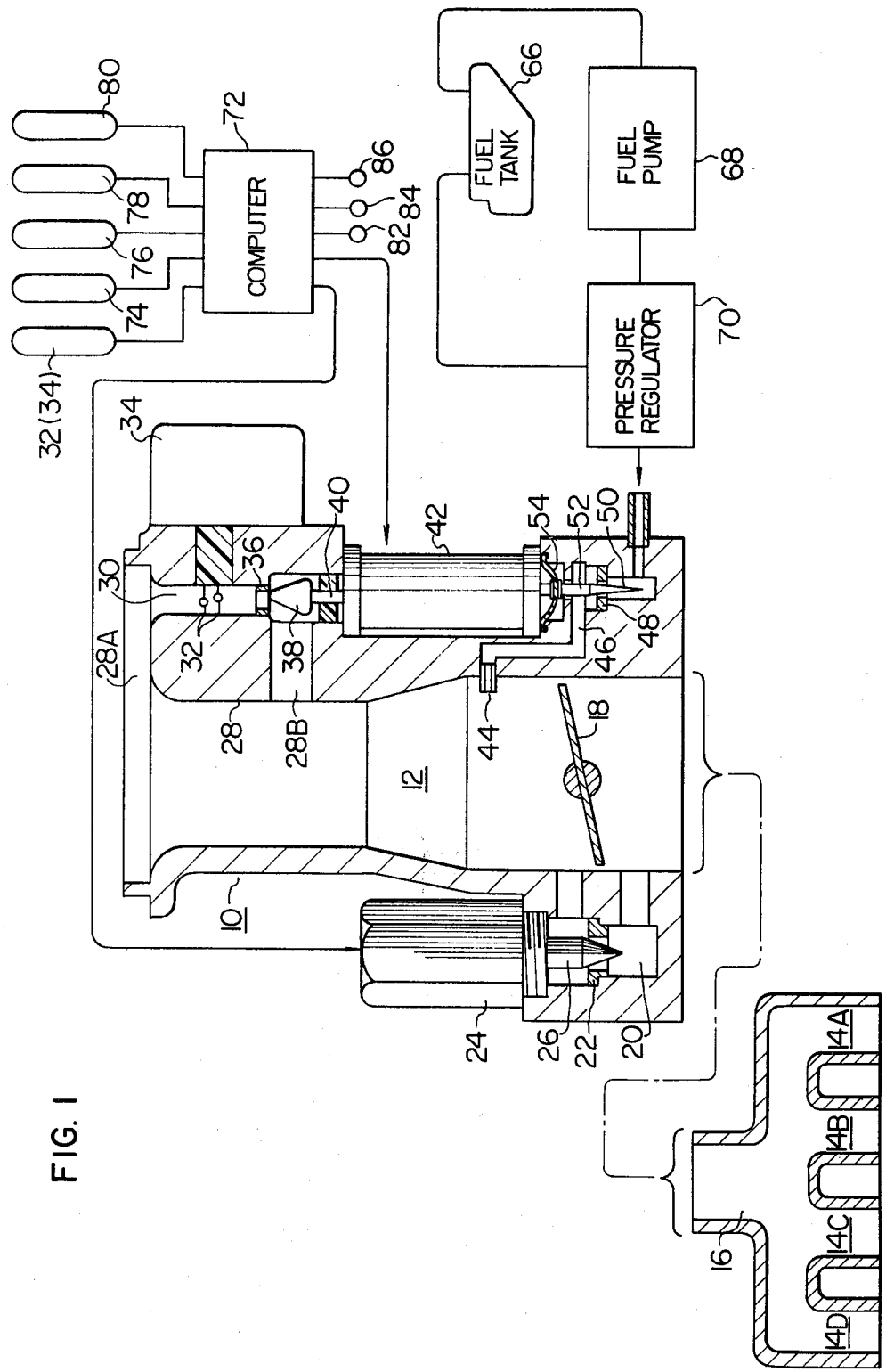
FIG. 1 is a cross-sectional view of a fuel injection apparatus for internal combustion engine according to one embodiment of this invention.

Referring to FIG. 1, there is shown a main body 10 in which an air-intake path 12 is formed. The air-intake path 12 is connected to a meeting portion 16 at which are met air-intake tubes 14A, 14B, 14C and 14D communicating with the respective cylinders of an internal combustion engine (not shown). A throttle valve 18 is rotatably mounted in the air-intake path 12 formed in the main body 10, and it is operated by an acceleration pedal (not shown). The air-intake path portions on the upper and lower sides of the throttle valve 18 are connected by a correction air-intake path 20 as a bypass. At a middle of this correction air-intake path 20 there is provided an orifice 22, which constitutes a scale together with a valve 26 which can be driven by an electromagnetic device 24. A Venturi portion 28 is formed in the air-intake path 12 on the upper side of the throttle valve 18 and it has an inlet portion 28A and a narrowest portion 28B which are connected by a bypass 30 formed in the body 10. At a middle of the bypass 30 is provided a heat-type flow sensor 32 such as a hot wire sensor, hot film sensor or Thomas meter. A signal from the heat-type sensor 32 is processed by a signal processing circuit 34 which is fixedly mounted on the main body 10. An air-scaling orifice 36 is provided in the bypass 30 on the lower side of the heat-type sensor 32 to make an air-scaling portion together with a tapered air-scaling valve 38, which is connected to a proportion electromagnetic device 42 via an output shaft 40.

Figure 2:
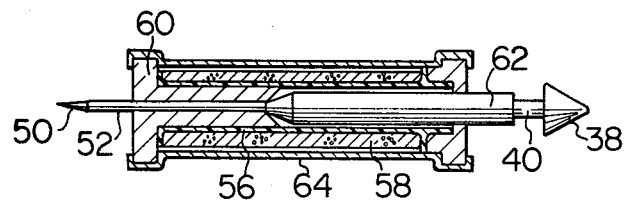
FIG. 2 is a cross-sectional view of a proportion electromagnetic device as shown in FIG. 1.

On the other hand, a fuel injection portion 44 is provided between the throttle valve 18 and the Venturi portion 28 so as to communicate with a fuel path 46 formed in the main body 10. A fuel scaling orifice 48 is provided in the fuel path 46 at a certain position and forms a fuel-scaling portion together with a tapered fuel-scaling valve 50, which is connected through an output shaft 52 to the proportion electromagnetic device 42. The output shaft 52 and the main body 10 are partitioned by a bellows type diaphragm 54 so that the fuel in the fuel path 46 does not leak out of the main body 10. The air-scaling valve 38, fuel-scaling valve 50 and proportion electromagnetic device 42 are constructed as shown in FIG. 2. In FIG. 2, the proportion electromagnetic device 42 is formed of a coil 58 wound on a hollow bobbin 56, a fixed core 60 inserted and fixed in the hollow of the bobbin 56, a movable core 62 slidably disposed in the hollow of the bobbin 56, a casing 64 and so on. The movable core 62 has one end fixed to the output shaft 40 and the other end fixed to the output shaft 52. Thus, the air-scaling valve 38, fuel-scaling valve 50 and movable core 62 are connected in line so that the air-scaling valve 38 and fuel-scaling valve 50 are simultaneously driven by the movable core 62.

The fuel in a fuel tank 66 is compressed by a fuel pump 68, regulated by a pressure regulator 70 and then fed to the fuel path 46. In this case, the pressure regulator 70 and fuel pump 68 used are known, and the pressure regulator 70 is constructed to provide a pressure of 0.7 kg/cm$^2$ to fuel.

The input and output of a difference amplifier or a computer 72 will hereinafter be described.

The computer 72 is supplied at its input with signals from the heat-type sensor 32 (equivalently from the signal processing circuit 34), a water temperature sensor 74 for detecting the temperature of the cooling water for engine, a revolution rate sensor 76 for detecting the number of revolutions of engine, a throttle valve opening degree sensor 78 for detecting the degree of opening of the throttle valve 18, and an oxygen sensor provided in the exhaust tube. Other engine operation parameters for various corrections may be applied to the computer 72.

On the other hand, the outputs of the computer 72 are fed to the electromagnetic device 24, proportion electromagnetic device 42, an EGR (exhaust gas recycle) control apparatus 82, an ignition timing control apparatus 84, and a control apparatus 86 for the fuel pump 68.

The above devices and apparatus other than the electromagnetic device 24 and the proportion electromagnetic device 42 will not be described because they are not concerned with this invention.

Figure 3:
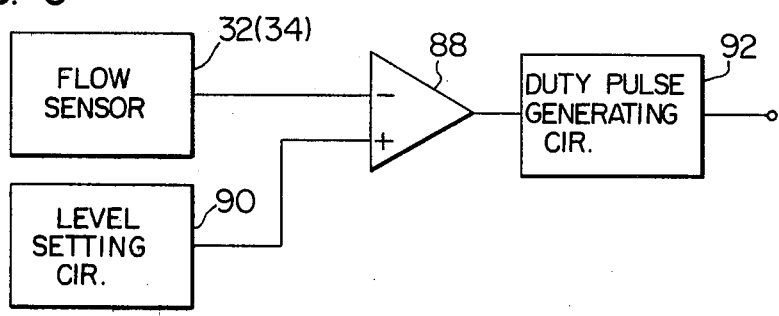
FIG. 3 is a block diagram of a control circuitry for converging the output of a heat-type flow sensor to a set level.

The signal fed to the proportion electromagnetic device 42 is a duty pulse signal the duration of which is controlled, and this duty pulse signal is formed by a circuit shown in FIG. 3, which is a part of the computer 72. A computer 88 has its inverting input terminal to which is applied a signal from the heat-type flow sensor 32, and its non-inverting input terminal to which is applied a level signal from a level setting circuit 90 a signal from the comparator 88 is fed to a duty pulse generating circuit 92 at the following stage, where it is converted to a duty pulse which is then fed to the proportion electromagnetic device 42.

Figure 4:
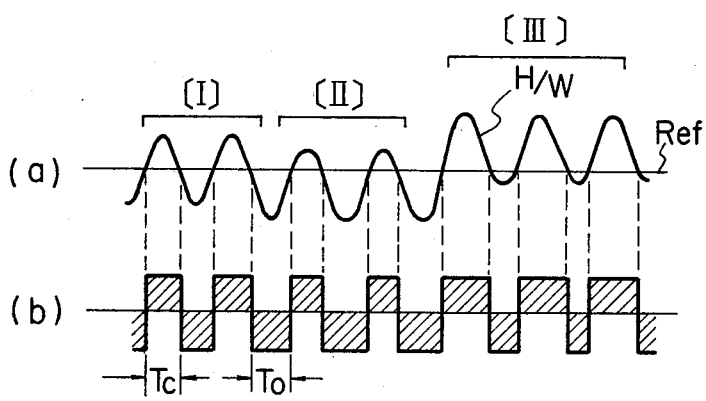
FIG. 4 is a waveform diagram showing the relation between the heat-type flow sensor and set level.

When the signal from the heat-type flow sensor 32, for example, as shown in FIG. 4 (a) by H/W, is applied to the inverting input terminal of the comparator 88, it is compared with a level $R_{ef}$ applied from the level setting circuit 90 to the non-inverting input terminal. Thus, the compared result is a pulse signal as shown in FIG. 4 (b). This pulse signal acts to drive a transistor within the duty pulse generating circuit 92 so as to produce the duty pulse therefrom. This duty pulse, as described above, is applied to the proportion electromagnetic device 42, which then drives the air-scaling valve 38 so that the output of the heat-type flow sensor 32 approaches the level $R_{ef}$. That is, the time, $T_c$ as shown in FIG. 4 (b) is given for closing of the air-scaling valve 38 and the time $T_o$ as shown for opening of the valve 38. Thus, the proportion electromagnetic device 42 can control the air-scaling valve 38 so that the output signal from the heat-type flow sensor 32 becomes constant.

In this case, the level setting circuit 90 can change the reference level in accordance with the operating condition of the engine, for example, with the signals from the water temperature sensor 74, revolution rate sensor 76, throttle valve open sensor 78, oxygen sensor 80, and so on.

The operation of the above mentioned arrangement will be described.

When the engine is operated now, air flows through the air-intake path 12, causing a pressure difference between the inlet portion 28A and narrowest portion 28B of the Venturi portion 28 as a result of a Venturi negative pressure produced at the narrowest portion 28B.

Accordingly, air flows from the inlet portion 28A of the Venturi portion 28 via the bypass 30 to the narrowest portion 28B of the Venturi portion 28. This air flow is detected by the heat-type flow sensor 32, the signal H/W from which, as shown in FIG. 3, is compared with the setting level $R_{ef}$ at the comparator 88. Thus, the throttle valve 18 is closed to reduce the amount of air to be supplied to the engine, so that the negative pressure at the Venturi portion 28 is decreased. Consequently, the value of the signal H/W from the sensor 32 becomes lower than the setting level $R_{ef}$ as indicated by region II in FIG. 4 (b) because low Venturi pressure decreases the air flow in the bypass 30. The comparator 88 supplies the H/W signal of time $T_o$ in FIG. 4, to the duty pulse generating circuit 92. As a result, the computer 72, including the duty pulse generating circuit 92, supplies the duty pulse to the proportion electromagnetic device 42 thereby pushing the air-scaling valve 38 downward in FIG. 1 so that the amount of air flow in the air-scaling portion, which amount is determined by the air scaling valve 38 and air-scaling orifice 36, reaches the setting level $R_{ef}$. At this time, since the moving core 62 of the proportion electromagnetic device 42 causes the fuel-scaling valve 50 to move in the same direction as does the air-scaling valve 38, the fuel flow in the fuel-scaling portion which is determined by the fuel-scaling valve 50 and fuel-scaling orifice 48 is naturally decreased with the decrease of air flow to the engine. The fuel passing the fuel-scaling valve 50 is injected into the air-intake path 12 from the fuel injection portion 44. The fuel injection flow from the fuel injection portion 44 is continuous. Of course, the shape of the fuel-scaling valve 50 must be determined so that the air/fuel ratio at this time approaches a target value, for example, a theoretical air/fuel ratio.

Then, when the air flow to the engine through the throttle valve 18 is increased, the Venturi negative pressure at the Venturi portion 28 increases and as a result must air flows through the bypass 30. Thus, the signal H/W from the heat-type flow sensor 32 becomes higher than the setting level $R_{ef}$ as indicated by region III in FIG. 4 (b). The comparator 88 supplies the signal H/W of much time $T_c$ as shown in FIG. 4 (b) to the duty pulse generating circuit 92. The computer 72 thus supplies the duty pulse to the proportion electromagnetic device 42 which then drives the air-scaling valve 38 to move upward in FIG. 1 so that the amount of air flow passing through the air-scaling portion, which amount is determined by the air-scaling valve 38 and air-scaling orifice 36, reaches the setting level $R_{ef}$. At this time, since the movable core 62 of the proportion electromagnetic device 42 also drives the fuel-scaling valve 50 to move in the same direction as does the air-scaling valve 38, the fuel passing the fuel-scaling portion, determined by the fuel-scaling valve 50 and fuel-scaling orifice 48, is naturally increased in accordance with the increase of air flow to the engine. The fuel passing the fuel-scaling valve 50 is injected as a continuous flow from the fuel injection portion 44 into the air-intake path 12. Of course, the shape of the fuel-scaling valve 50 is determined so that the air/fuel ratio at this time approaches to a target value as set forth above.

When the throttle valve 18 is opened to a constant degree, the value of the signal H/W from the sensor 32 has equal proportions of higher- and lower-portions than the setting level $R_{ef}$ as indicated by region I in FIG. 4 (b). Therefore, the proportion electromagnetic device 42 is kept at that condition and thus the fuel-scaling portion formed of the fuel-scaling valve 50 and fuel-scaling orifice 48 is considered to be substantially a fixed orifice. Of course, the shape of the fuel-scaling valve 50 is determined so that the air/fuel ratio approaches a theoretical value.

The fundamental construction and the operation of the apparatus according to this invention have been described as above. According to this invention, since the fuel injection portion continuously supplies fuel into the air-intake path at the meeting portion of the air-intake tubes, the mixture of air and fuel can be kept uniform in the space between the air-intake path and the meeting portion of the air-intake tubes. Secondly, since it is enough that the signal from the air flow meter is fundamentally shown below or above the setting level, the precision of the air flow meter may be relatively low, and a signal processing circuit to be connected to the air flow meter can be simplified in its construction. Moreover, since the air flow meter is on the upper side of the air-scaling valve, the air-scaling valve attenuates the air-intake pulsation to prevent the air flow meter from undergoing the air-intake pulsation.

In FIG. 1, the electromagnetic device 24, valve 26, orifice 22 and correction air path 20 has a function of controlling the idle rotational speed rate. In other words, the computer 72 has stored therein a target idle rotational speed rate associated with the temperature of cooling water for engine, and an actual idle rotational speed rate is compared with this target idle rotational speed rate, a control signal based on the resulting deviation therebetween being applied to the electromagnetic device 24 so as to change the amount of air flow in the correction air path 20 with the result that the actual idle rotational speed rate converges with the target idle rotational speed rate. Thus, the actual idle rotation rate can be controlled to be a value suitable for the temperature of engine. In this case, the signals from the water temperature sensor 74 and the rotation rate sensor 76 are stored in the computer 72 and properly processed to produce a control signal.

Figure 5:
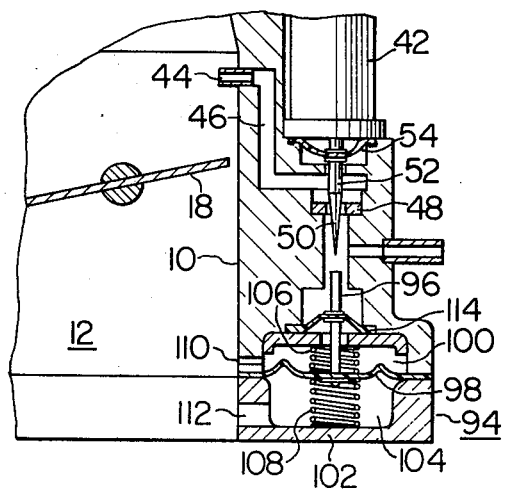
FIG. 5 is a cross-sectional diagram of a first acceleration correcting device.

FIG. 5 shows a correcting device constructed as an accelerating device for increasing the amount of fuel supplied to the engine for smooth acceleration of the engine. An accelerating device 94 is formed of a push rod 96 positioned on the same axis of the fuel-scaling valve 50, a diaphragm 98 fixing the push rod 96, a first pressure chamber 100 formed by the diaphragm 98 and the main body 10, a second pressure chamber 104 formed by the diaphragm 98 and the cover 102, a first compression spring 106 disposed in the first pressure chamber 100, a second compression spring 108 disposed in the second pressure chamber 104, a first signal path 110 for connecting the first pressure chamber, the second pressure chamber 104 and the air-intake path 12, a second signal path 112, and a seal bellows type diaphragm 114 for isolating the first pressure chamber 100 from the fuel path 46. The second signal path 112 has a wider diameter than the first signal path 100.

Before the engine is accelerated, the pressures in the first and second pressure chambers 100 and 104 are equal, and the position of the push rod 96 is determined by the balance of the forces which the first and second compression springs 106 and 108 exert. When the throttle valve 18 is rapidly opened for acceleration of engine, the pressure on the downstream side of the throttle valve 18 approaches the atmospheric pressure and transmitted through the first and second signal paths 110 and 112 to the first and second pressure chambers 100 and 104. At this time, since the first signal path 110 has a smaller diameter than the second signal path 112, the first pressure chamber 100 has a pressure changed as indicated by one-dot chain line A in FIG. 6 and the second pressure chamber 104 has a pressure changed as indicated by solid line B in FIG. 6. Consequently, a pressure difference takes place between the first and second pressure chambers 100 and 104 with the result that the diaphragm 98 is displaced upward in FIG. 5 and thus the push rod 96 is moved as shown in FIG. 7. It follows that the push rod 96 forces the fuel scaling valve 50 to move upward in FIG. 5 so as to increase the amount of fuel flow passing through the fuel-scaling valve 50. Thus, upon acceleration, the amount of fuel supply can be increased temporarily.

FIG. 8 shows another embodiment of the accelerating device. An accelerating device 116 is formed of a diaphragm 120 held between the main body 10 and a cover 118, an operating pressure chamber 122 formed by the diaphragm 120 and the cover 118, a compression spring 124 provided in the operating pressure chamber 122, a pressure path 126 for transmitting the pressure at the downstream side of the throttle valve 18 to the operating pressure chamber 122, a pump chamber 128 formed by the diaphragm 120 and the main body 10, a fuel introducing path 130 for connecting the pump chamber 128 and the fuel path 46 on the upstream side of the fuel-scaling orifice 48, a check valve 132 provided in the fuel introducing path 130 to allow fuel to flow to the pump chamber 128, a fuel leading-out path 136 for connecting the pump chamber 128 and an acceleration nozzle 134 opening toward the air-intake path 12, and a check valve 138 provided in the fuel lead-out path 136 to allow fuel to flow only to the acceleration nozzle 134.

Before the engine is accelerated, the pump chamber 128 has fuel loaded therein. At this time, the operating pressure chamber 122 is at a negative pressure and thus the compression spring 124 is bent. When the throttle valve 18 is opened for acceleration of engine, the operating pressure chamber 122 has a pressure close to the atmospheric pressure, and the compression spring 124 forces the diaphragm 120 to move to the right in FIG. 8, thereby causing the fuel within the pump chamber 128 to be injected from the acceleration nozzle 134 into the air-intake path 12 via the fuel lead-out path 136. Thus, upon acceleration, fuel supply can be increased temporarily.

Description will be made of a decelerating device for decreasing harmful components within the exhaust gas by cutting off the fuel to the engine upon deceleration.

In FIG. 9, a decelerating device 140 is formed of a fuel cut-off electromagnetic valve 142 and a seat portion 144. This seat portion 144 is provided in a path 46A for connecting the fuel-scaling valve 50 and the pressure regulator 70.

When the engine is decelerated, the fuel cut-off electromagnetic valve 142 closes the seat portion 144, stopping the fuel from being injected from the fuel injecting portion 44. The stopping of fuel supply upon deceleration of engine can greatly contribute to the decrease of harmful components within the exhaust gas.

The signal to the fuel cut-off electromagnetic valve 142 is supplied from the computer 72 when the throttle valve 18 is opened to a degree for idle and the rotational speed rate of the engine is higher than the rotation rate of idle. Thus, the input to the computer 72 is the signals from the rotation rate sensor 76, and the opening degree sensor 78.

Description will be made of a start correction device for supplying a dense fuel-air mixture upon starting of engine so as to start the engine in good condition.

Figure 10:
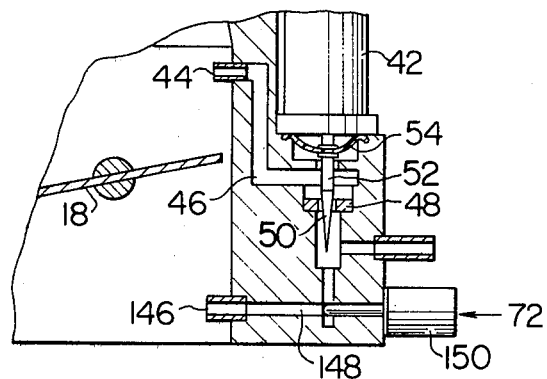
FIG. 10 is a cross-sectional diagram of a start correcting device.

In FIG. 10, a start nozzle 146 opens into the air-intake path on the downstream side of the throttle valve 18 and the start fuel nozzle 146 communicates with the fuel path 46 on the upstream of the fuel-scaling orifice 48 via a start fuel path 148. An electromagnetic fuel control valve 150 is provided in the start fuel path 148.

When the engine starts, the fuel-scaling valve 50 and the fuel-scaling orifice 48 are operated to scale fuel and the fuel is supplied from the fuel injection portion 44. In addition, the fuel control valve 150 opens to permit start increment fuel to be supplied via the start fuel path 148 from the start nozzle 146, thereby making the engine start in good condition.

The signal to be transmitted to the electromagnetic fuel control valve 150 is of course supplied from the computer 72, and it is generated when the throttle valve 18 is opened to a degree for idle and when the temperature of engine is lower than a predetermined value. Thus, the computer 72 is supplied with the signals from the opening degree sensor 78 and the water temperature sensor 76.

The start nozzle 146 can also be used as an acceleration increment nozzle, in which case the electromagnetic fuel control valve 150 may be opened upon acceleration. At this time, the computer 72 detects the opening speed signal from the opening degree sensor 78 to decide the acceleration of the engine.

Description will be made of a device for promoting the vaporization of the fuel supplied from the fuel injection portion 44.

If, for example, the engine is operated at low speed with high load (slope ascending driving is typical of this condition), the speed of air flow passing through the air-intake path 12 is slow in spite of the fact that the throttle valve 18 is opened to a large extent, and thus the fuel supplied from the fuel injection portion 44 is not fully vaporized. In order to promote the vaporization of fuel in this condition, a device as shown in FIG. 11 is employed.

Figure 11:
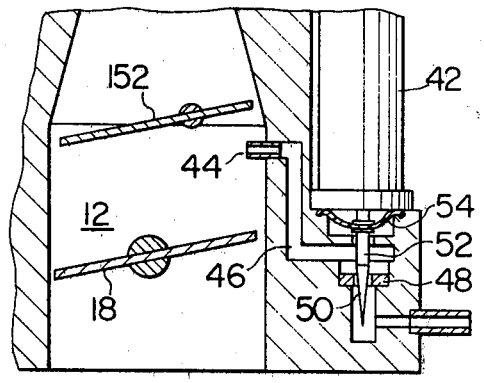
FIG. 11 is a cross-sectional diagram of a fuel vaporizing means.

In FIG. 11, an eccentric valve 152 is rotatably mounted in the air-intake path 12 on the upstream side of the fuel injection portion 44. This eccentric valve 152 is slightly opened when a small amount of air flow passes in the air intake path 12, and it increases its opening degree as the amount of air flow increases.

Thus, when the engine is operated at low speed with a heavy load, the eccentric valve 152 is slightly opened even if the throttle valve 18 is opened to a great extent, and therefore the air flow speed is high at the peripheral edge of the eccentric valve 152. Consequently, the fuel supplied from the fuel injection portion 44 is vaporized by this air flow at high speed.

Figure 12:
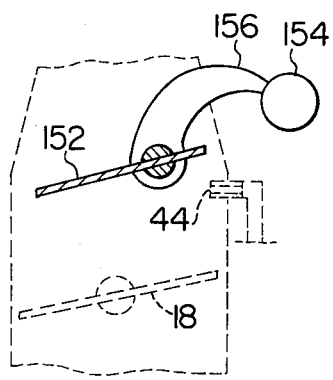
FIGS. 12 and 13 are cross-sectional diagrams of control mechanisms of the fuel vaporizing means as shown in FIG. 11.

FIG. 12 shows a control mechanism of the eccentric valve 152. This eccentric valve 152 is urged to be always closed by a torsion spring (not shown), and a counterlever 156 with a counterweight 154 fastened to the eccentric valve 152. The extent to which the eccentric valve 152 is opened is determined by the balance with the dynamic pressure the air flow exerts on the eccentric valve 152. Thus, if a small amount of air flows in the air-intake path 12 under the condition that the throttle valve 18 is opened to a great extent, the eccentric valve 152 is opened to a small extent.

Moreover, the eccentric valve 152 can be given the following function.

For example, when the throttle valve 18 is opened upon acceleration, the speed of air flow passing by the fuel injection portion 44 is described temporarily, thus the fuel upon acceleration is not fully vaporized. In order to solve this problem, a device as shown in FIG. 13 is considered.

Figure 13:
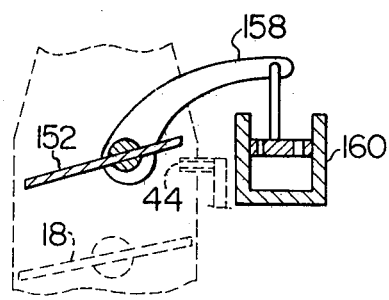

In FIG. 13, a lever 158 fixed to the eccentric valve 152 is connected to a dash pot 160. The dash pot 160 has a function that, when the eccentric valve 152 is intended to be rapidly opened, weakens the quick opening operation to a slow operation. Thus, when the throttle valve 18 is opened upon acceleration, the eccentric valve 152 is intended to rapidly open, but the dash pot 160 acts to delay the quick opening operation. As a result, the air flow passing through the peripheral edge of the eccentric valve 152 is increased in its speed, so that the air flow passing around the fuel injection portion 44 is increased in its speed to promote the vaporization of fuel.

The fuel-scaling valve 50 and the fuel-scaling orifice 48 are required to precisely scale the amount of fuel in the wide range of conditions from the idling drive to high-speed drive as set forth above. However, the pressure regulator 70, which is set to the fuel pressure of 0.7 kg/cm², is provided on the upstream side of the fuel-scaling valve 50 and the fuel-scaling orifice 48, and therefore a pressure difference of about 0.7 kg/cm² takes place between the upstream and downstream sides of the fuel-scaling orifice 48. Thus, in order to precisely scale the amount of fuel, the fuel-scaling valve 52 and fuel-scaling orifice 48 must be made with high precision. To solve this problem, devices for correcting the pressure of fuel to the fuel-scaling valve 52 and fuel-scaling orifice 48 as shown in FIGS. 14 and 15 are employed.

Figure 14:
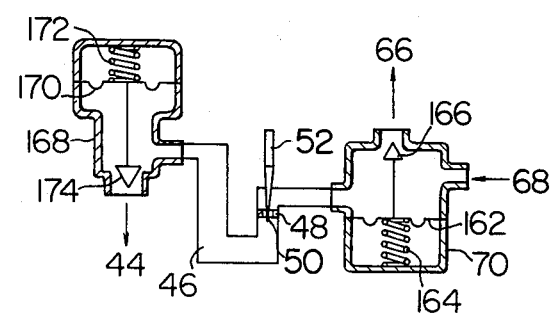
FIG. 14 is a cross-sectional diagram of a pressure correcting device for fuel passing through a fuel-scaling valve.

In FIG. 14, the first pressure regulator 70 is provided on the upstream side of the fuel-scaling orifice 48. This regulator 70 is formed of a diaphragm 162, a compression spring 164, and a pressure regulating valve 166. When the fuel fed from the fuel pump 68 exceeds a predetermined pressure, or in this example, 0.7 kg/cm², the fuel escapes from the pressure regulating valve 166 to the fuel tank 66, so as to be kept at a certain pressure. On the other hand, a second pressure regulator 168 is provided on the downstream side of the fuel-scaling orifice 48, and it is formed of a diaphragm 170, a compression spring 172, and a pressure regulating valve 174. The pressure regulating valve 174 opens when the fuel pressure is 0.6 kg/cm², to send the fuel to the fuel injection portion 44. Thus, a pressure difference between the first and second pressure regulators 70 and 168 is as low as 0.1 kg/cm², so that fuel flow can be scaled precisely without increasing the precision of the fuel-scaling valve 50 and fuel-scaling orifice 48.

Figure 15:
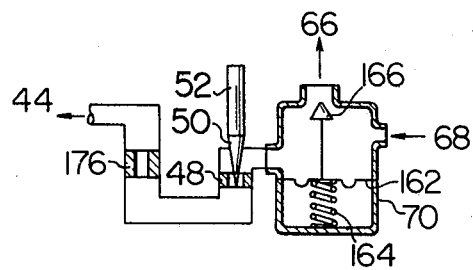
FIG. 15 is a cross-sectional diagram of another embodiment of the device as shown in FIG. 14.

The device of FIG. 15 employs an orifice 176 in place of the second pressure regulator 168. This orifice 176 can also reduce the pressure difference between the upstream and downstream sides of the fuel-scaling orifice 48.

The above-described correcting devices are mechanical devices. Description will be made of an electrical device for changing a signal to be fed to the proportion electromagnetic device 42.

Figure 16:
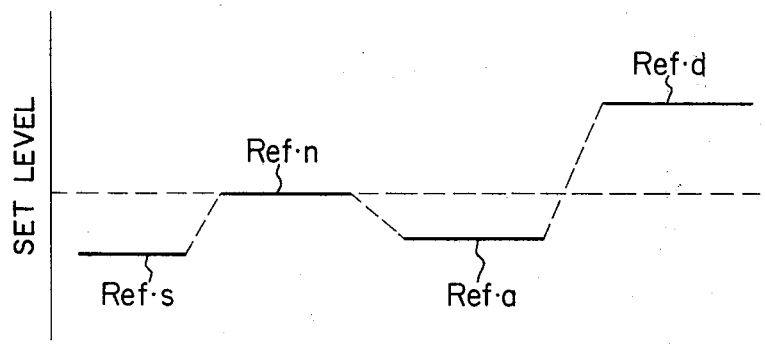
FIG. 16 is a waveform diagram showing the relation between drive condition and set level.

FIG. 16 shows a method of increasing or decreasing (inclusive of cut-off) the amount of fuel by changing the set level in accordance with the drive condition.

Upon starting, a phenomenon occurs that smooth engine rotation is not achieved due to a friction resistance of engine or the like. In this case, the set level is made as $R_{ef.s}$ lower than the normal drive set level $R_{ef.n}$. Lowering of set level increases the time-$T_c$ component as shown in FIG. 4 (b), and thus the proportion electromagnetic device 42 drives the air-scaling valve 38 to decrease the amount of air passing through the bypass 30. On the other hand, the fuel-scaling valve 50 is moved to increase the amount of fuel. Consequently, the fuel amount can be increased upon starting.

Also, upon acceleration, it is necessary to increase the amount of fuel in order to well follow the acceleration. In this case, similarly as in the starting time, the set level is made as $R_{ef.a}$ lower than the set level of $R_{ef.n}$ at the normal drive, but larger than the set level of $R_{ef.s}$ at the starting time. Thus, at this time, the proportion electromagnetic scaling valve 42 drives the air-scaling valve 38 to decrease the amount of air passing through the bypass 30 and thus the amount of fuel passing through the fuel-scaling valve 50 is increased.

Upon deceleration, it is necessary to extremely reduce the amount of fuel or cut off it in order to decrease the harmful components in the exhaust gas. In this case, the set level is increased to $R_{ef.a}$ larger than the $R_{ef.n}$ at the normal drive. Increase of set level increases the time-$T_o$ components as shown in FIG. 4(b), and thus, the proportion electromagnetic device 42 drives the air-scaling valve 38 to increase the amount of air passing through the bypass 30. Then, on the contrary, the fuel-scaling valve 50 is moved to decrease the amount of fuel, thereby enabling the fuel upon decelerating to be decreased to a small amount or to be cut off.

Figure 17:
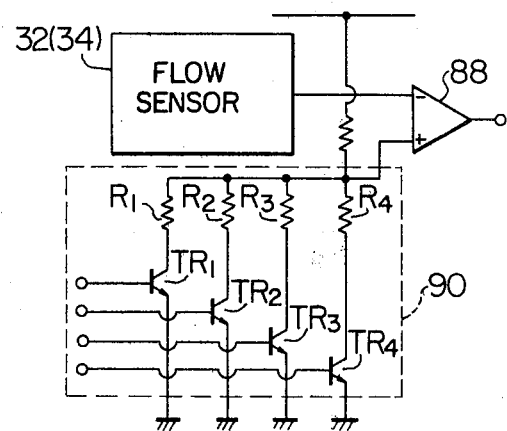
FIG. 17 is a circuit diagram of a level setting circuit for determining the set level as shown in FIG. 16.

Such a correction can be performed by a circuit as shown in FIG. 17.

As shown in FIG. 17, a level setting circuit 90 for performing the above-mentioned correction is formed of parallel connected resistors $R_1$ to $R_4$ and transistors $TR_1$ to $TR_4$. When the values of the resistors $R_1$, $R_2$, $R_3$ and $R_4$ are selected as $R_1 > R_2 > R_3 > R_4$, and the value of the resistor $R_2$ is a set level $R_{ef.n}$ at the normal drive time, the value of the resistor $R_1$ is a set level $R_{ef.d}$ at the decelerating time, that of the resistor $R_3$ is a set level $R_{ef.a}$ at the accelerating time, and that of the resistor $R_4$ is a set level $R_{ef.s}$ at the starting time. Thus, if each of these resistors $R_1$ to $R_4$ is connected in the circuit at the corresponding drive time by turning on the associated one of the transistors $TR_1$ to $TR_4$, the set level can be determined. The turning-on of the transistors $TR_1$ to $TR_4$ is controlled by the computer 72.

Description will be made of a correcting circuit for permitting the proportion electromagnetic device 42 to drive the air-scaling valve 38 and the fuel-scaling valve 50 in good response to the acceleration and deceleration modes.

Figure 18:
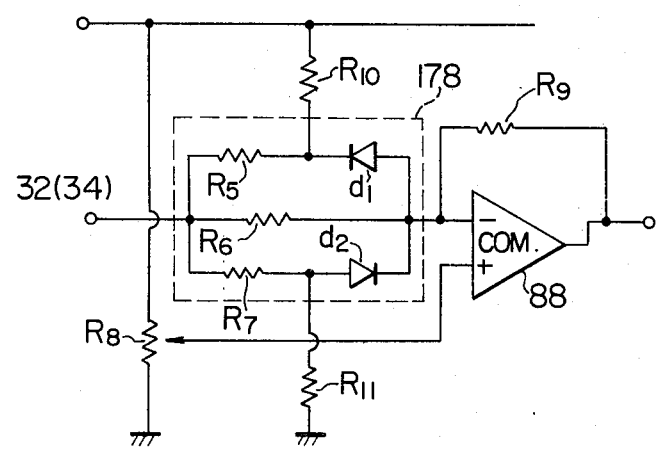
FIG. 18 is a diagram of a gain switching circuit for changing the gain on a signal to be applied to the proportion electromagnetic device.

In FIG. 18, a gain control circuit 178 is provided between the inverting input terminal of the comparator 88 and heat-type flow sensor 32. The gain control circuit 178 is formed of parallel-connected resistors $R_5$ to $R_7$ between the heat-type flow sensor 32 and comparator 88, and diodes $d_1$ and $d_2$ respectively connected in series with the resistors $R_5$ and $R_7$ (the diodes connected reversely in their polarity). A resistor $R_8$ is for setting level, $R_9$ for shunting the output and inverting input terminals of the comparator 88, and $R_{10}$ and $R_{11}$ for setting gain switching voltages.

The gain, G determined by the resistors $R_5$ to $R_7$ and the resistor $R_9$ is given by the following expression:

$$G_1 = R_9/R_5 + R_9/R_6,$$

$$G_2 = R_9/R_6$$

$$G_3 = R_9/R_6 + R_9/R_7$$

Thus, at the normal drive time, the proportion electromagnetic device 42 is driven with gain $G_2$. At the accelerating or decelerating time, the proportion electromagnetic device 42 is driven with gain $G_1$ or $G_3$. This gain control circuit 178 has a function of changing rapidly a signal to be sent to the proportion electromagnetic device 42 to increase the operation speed of the proportion electromagnetic device 42 when the deviation between the set level and the value from the heat-type flow sensor 32 is a predetermined value or above, namely, at the accelerating time or decelerating time. Therefore, at the accelerating or decelerating time, the proportion electromagnetic device 42 can drive the air-scaling valve 38 and fuel-scaling valve 50 in good response.

If the correcting device as described above is properly incorporated in the apparatus of FIG. 1, the fuel injection device is more improved.

We claim:

1. A fuel injection apparatus for internal combustion engine comprising:
   an air-intake path connected to the upstream side of an air-intake tube meeting portion;
   a Venturi portion formed in said air-intake path;
   a throttle valve provided in said air-intake path on the downstream side of said Venturi portion;
   an air bypass for connecting the upstream side of said Venturi portion and said Venturi portion;
   an air flow meter provided in said air bypass so as to detect the amount of air flow in said air bypass;
   an air-scaling valve provided in said air bypass on the downstream side of said air flow meter;
   a fuel path through which fuel from a fuel pump is continuously fed into said air-intake path when the internal combustion engine is operating;
   a fuel-scaling valve provided in said fuel path;
   a drive means for controlling the degree to which said air-scaling valve and said fuel-scaling valve are opened, so that when said air-scaling valve is displaced to decrease the amount of air flow in said air bypass, said fuel-scaling valve is displaced to increase fuel; and
   a control signal generating means for applying a control signal to said drive means so that the degree to which said air-scaling valve is opened is controlled for the output of said air flow meter to converge to a certain set level.

2. A fuel injection apparatus according to claim 1, wherein said fuel path supplies fuel into said air-intake path on the upstream side of said throttle valve.

3. A fuel injection apparatus according to claim 1, wherein said drive means is an electromagnetic device.

4. A fuel injection apparatus according to claim 3 wherein said air-scaling valve, said fuel-scaling valve and said electromagnetic device are disposed on the same axis.

5. A fuel injection apparatus according to claim 4, wherein said air-scaling valve and said fuel-scaling valve are formed in a taper shape so that when said air-scaling valve is displaced to decrease the amount of air flow passing therethrough, said fuel-scaling valve is displaced to increase the amount of fuel passing therethrough.

6. A fuel injection apparatus according to claim 3, wherein said air flow meter is a heat-type flow sensor.

7. A fuel injection apparatus according to claim 6, wherein an output signal from said heat-type flow sensor is compared with a set level established by a level setting means, at a comparator, and an output signal from said comparator is applied to a duty pulse generating circuit connected to said comparator.

8. A fuel injection apparatus according to claim 7, wherein in a driving condition in which a high output is required, said level setting means supplies to said comparator such a set level as to increase the amount of fuel passing said fuel-scaling valve.

9. A fuel injection apparatus according to claim 7, wherein at a decelerating drive time, said level setting means supplies to said comparator such a set level as to cut off the fuel passing through said fuel-scaling valve or reduce it to an extremely small amount.

10. A fuel injection apparatus according to claim 7, wherein a gain control means is provided between said heat-type flow sensor and said comparator so that upon acceleration and deceleration said electromagnetic device is quickly operated.

11. A fuel injection apparatus for internal combustion engine comprising:
    a main body having an air-intake path connected to the upstream side of an air-intake tube meeting portion;
    a Venturi portion formed in said air-intake path;
    a throttle valve provided in said air-intake path on the downstream side of said Venturi portion;
    an air bypass provided at said main body so as to connect the upstream side of said Venturi portion and said Venturi portion;
    a heat-type flow sensor provided in said air bypass so as to detect the amount of air flow in said air bypass;
    a tapered air-scaling valve provided in said air bypass on the downstream of said heat-type flow sensor;
    a fuel path provided at said main body so as to allow the fuel from a fuel pump to be continuously fed therethrough and through a fuel injection portion into said air-intake path when the internal combustion engine is operating;
    a tapered fuel-scaling valve provided in said fuel path to position on the extension of the operation line on which said air-scaling valve operates;
    an electromagnetic device for driving said fuel-scaling valve and said air-scaling valve so that when said air-scaling valve is displaced to decrease the amount of air flow in said air bypass, said fuel-scaling valve is displaced to increase the supply fuel, said electromagnetic device being located between said air-scaling valve and said fuel-scaling valve to be on the extension of the operation line on which said air-scaling valve operates, and fixed to said main body; and
    a control signal generating means for supplying an electrical control signal to said electromagnetic device so as to control the degree to which said air-scaling valve opens so that the output of said heat-type flow sensor is converged to a predetermined set level.

12. A fuel injection apparatus according to claim 11, wherein said fuel-scaling valve and said main body are connected by a seal diaphragm for preventing fuel from leaking output of said main body.

13. A fuel injection apparatus according to claim 11, wherein said main body is provided with an accelerating means for forcibly increasing the degree to which said fuel-scaling valve opens, independently of said electromagnetic device, upon accelerating drive.

14. A fuel injection apparatus according to claim 11, wherein said main body is provided with a accelerating means for supplying additional fuel from a fuel supply aperture other than said fuel injection portion upon accelerating drive.

15. A fuel injection apparatus according to claim 11, wherein a decelerating cut off means is provided for closing said fuel path to cut off the fuel from said fuel injection portion upon decelerating drive.

16. A fuel injection apparatus according to claim 11, wherein said main body is provided with a start incrementing means for supplying additional fuel through a fuel supplying aperture other than said fuel injection portion upon starting.

17. A fuel injection apparatus according to claim 11, wherein an auxiliary valve, which closes when a small amount of air passes through said throttle valve and opens when a large amount of air passes therethrough, is provided in said air-intake path on the upstream side of said fuel injection portion.

18. A fuel injection apparatus according to claim 11, wherein a first fuel pressure regulator is provided between said fuel-scaling valve and said fuel pump, and a second fuel pressure regulator set to a lower pressure than the fuel pressure to which said first fuel pressure regulator regulates is provided between said fuel-scaling valve and said fuel injection portion.

19. A fuel injection apparatus according to claim 18, wherein said second fuel regulator is a fixed orifice.

20. A fuel injection apparatus for an internal combustion engine comprising:
means for defining an air intake path;
bypass means for enabling a bypassing of at least a part of air flowing into the air intake path;
air flow sensor means arranged in said bypass means; and
control means for controlling a rate of air flow through said bypass means in response to an output signal from the air flow sensor means and for controlling an amount of fuel supplied to said air intake path, said control means including an air scaling valve means in said bypass means for controlling said air flow rate passing through said bypass means.

21. A fuel injection apparatus according to claim 20, wherein said control means further includes a comparator means for comparing a value of the output of said air flow sensor means with a predetermined value and for providing an output signal to a duty pulse generating circuit connected to said comparator means.

22. A fuel injection apparatus according to claim 21, wherein said control means further includes a value setting circuit means for supplying the comparator means with a predetermined value in dependence upon at least one predetermined operating parameter of the internal combustion engine.

23. A fuel injection apparatus according to claim 22, wherein said level setting means is adapted to supply an output signal to the comparator means at a value for increasing the amount of fuel supplied to the air intake path when the engine is at a high output range of operation.

24. A fuel injection apparatus according to claim 22, wherein said level setting means is adapted to supply an output signal at a value for one of cutting off or reducing to a small amount the fuel supplied to the air intake path during a deceleration operation of the internal combustion engine.

25. A fuel injection apparatus according to claim 24, wherein said control means further includes a fuel scaling valve means, said air scaling valve means being constructed such that, upon a displacement of the air scaling valve means in a direction to decrease the amount of air flow, the fuel scaling valve means is displaced to increase the amount of fuel supplied to the air intake path.

26. A fuel injection apparatus according to claim 20, wherein said air flow sensor means is disposed upstream of the air scaling valve means as viewed in a normal air flow direction.

27. A fuel injection apparatus according to claim 20, further comprising means for shutting off the supply of fuel to the air intake path upon a decelerating operation of the internal combustion engine.

28. A fuel injection apparatus according to claim 20, further comprising means for supplying additional fuel to the air intake path upon an acceleration operation of the internal combustion engine.

29. A fuel injection apparatus according to claim 20, further comprising means for supplying additional fuel to the air intake path during a starting operation of the internal combustion engine.

30. A fuel injection apparatus according to claim 20, further comprising an auxiliary valve means disposed upstream of a throttle valve means for controlling a flow of air in the air intake path, and means for mounting the auxiliary valve means in the air intake path such that the valve means closes when a small volume of air passes through the air intake path and opens when a large volume of air passes through the air intake path.

31. A fuel injection apparatus according to claim 30, wherein the fuel is supplied to the air intake path at a position between the auxiliary valve means and the throttle valve means.

32. A fuel injection apparatus according to claim 30, wherein said means for mounting the auxiliary valve means includes a lever means connected to said auxiliary valve means and a counterweight means arranged on the lever means, whereby a positioning of the auxiliary valve means is determined by a balance of dynamic pressure of the air flow on the auxiliary valve means.

33. A fuel injection apparatus according to claim 30, further comprising means operatively connected with the auxiliary valve means for controlling an opening speed of the auxiliary valve means.

34. A fuel injection apparatus according to claim 33, wherein said means for controlling an opening speed includes a dashpot means connected to the auxiliary valve means.

35. A fuel injection apparatus according to claim 20, wherein said control means includes a fuel scaling valve means cooperable with a fuel scaling orifice, means are provided for correcting a pressure of the fuel supply to the fuel scaling valve means and fuel scaling orifice including regulator means interposed between the fuel scaling valve means and orifice means and a fuel pump means.

36. A fuel injection apparatus according to claim 35, wherein said regulator means includes a first fuel pressure regulator disposed between the fuel scaling valve means and fuel pump means, and a second fuel pressure regulator provided between the fuel scaling valve means and a point at which fuel is injected into the air intake path.

37. A fuel injection apparatus according to claim 36, wherein said second fuel pressure regulator is set to a lower fuel pressure than said first fuel pressure regulator.

38. A fuel injection apparatus according to claim 20, wherein said control means further includes a second valve means for controlling an amount of fuel supplied, and means for interconnecting said air scaling valve means and said second valve means so as to enable a simultaneous operation of both of said valve means.

39. A fuel injection apparatus according to claim 38, wherein said means for interconnecting said air scaling valve means and second valve means includes an electromagnetic means interposed between said air scaling valve means and said second valve means in such a manner that, upon energization of the electromagnetic means, a displacement of respective ones of said valve means in an opening direction results in a displacement of the other of the valve means in a closing direction.

40. A fuel injection apparatus according to claim 39, wherein said electromagnetic means includes a movable core having the air scaling valve means and second valve means connected at respective ends thereof.

41. A fuel injection apparatus according to claim 20, wherein means are provided for supplying additional fuel to the air intake path during a starting operation of the internal combustion engine including a start nozzle means communicating the air intake path, and means for controlling a fuel supply to the start nozzle means.

42. A fuel injection apparatus according to claim 41, wherein said means for controlling a fuel supply means includes a selectively actuatable valve means.

43. A fuel injection apparatus according to claim 42, wherein said selectively actuatable valve means is constructed as an electromagnetically operated valve.

44. A fuel injection apparatus according to claim 20, wherein said control means includes means for correcting an air flow in the bypass means and the fuel supplied to the intake air path in dependence upon at least one operating mode of the internal combustion engine.

45. A fuel injection apparatus according to claim 44, wherein said means for correcting includes a level setting circuit means for setting predetermined values of air flow and fuel supply for the operating mode of the internal combustion engine.

46. A fuel injection apparatus according to claim 45, wherein the level setting circuit means is adapted to set predetermined valves of air flow and fuel supply for the internal combustion engine during at least a starting, acceleration, and deceleration operating mode of the internal combustion engine.

* * * * *